(12) United States Patent
Liu

(10) Patent No.: US 11,977,253 B2
(45) Date of Patent: May 7, 2024

(54) BACKLIGHT MODULE INCLUDING OVERLAPPED REFLECTIVE SHEETS AND DISPLAY DEVICE INCLUDING THE SAME

(71) Applicant: TCL China Star Optoelectronics Technology Co., Ltd., Shenzhen (CN)

(72) Inventor: Jinfeng Liu, Shenzhen (CN)

(73) Assignee: TCL China Star Optoelectronics Technology Co., Ltd., Shenzhen (CN)

( * ) Notice: Subject to any disclaimer, the term of this patent is extended or adjusted under 35 U.S.C. 154(b) by 0 days.

(21) Appl. No.: 17/430,113

(22) PCT Filed: Jul. 15, 2021

(86) PCT No.: PCT/CN2021/106555
§ 371 (c)(1),
(2) Date: Dec. 29, 2022

(87) PCT Pub. No.: WO2022/267110
PCT Pub. Date: Dec. 29, 2022

(65) Prior Publication Data
US 2024/0012194 A1    Jan. 11, 2024

(30) Foreign Application Priority Data
Jun. 21, 2021 (CN) .......................... 202110684767.0

(51) Int. Cl.
*F21V 8/00* (2006.01)
*G02F 1/13357* (2006.01)

(52) U.S. Cl.
CPC ........... *G02B 6/009* (2013.01); *G02B 6/0055* (2013.01); *G02B 6/0068* (2013.01);
(Continued)

(58) Field of Classification Search
CPC ............. G02F 1/1336; G02F 1/133602; G02F 1/133608; G09G 3/32; G09G 2360/122; H05K 5/0021; H10K 59/18
See application file for complete search history.

(56) References Cited

U.S. PATENT DOCUMENTS

2011/0128450 A1    6/2011    Yoshikawa

FOREIGN PATENT DOCUMENTS

CN    110488533 A    11/2019
CN    110908188 A    3/2020
(Continued)

OTHER PUBLICATIONS

English Machine Translation of CN 111208673 A (Year: 2020).*

*Primary Examiner* — Keith G. Delahoussaye
(74) *Attorney, Agent, or Firm* — Nathan & Associates; Menachem Nathan

(57) ABSTRACT

A backlight module and a display device are provided. The backlight module includes a plurality of light boards, wherein each light board includes at least two light source groups arranged at intervals. An overlap area of adjacent reflective sheets is located between adjacent light source groups in a same light board, and a splicing area of adjacent light boards is located in a non-overlap area of a same reflective sheet so that a protrusion of the reflective sheets in the overlap area will not reflect too much light to the splicing area, which solves a problem of uneven brightness at splicing positions of the light boards of current display products.

18 Claims, 4 Drawing Sheets

(52) U.S. Cl.
CPC ......... *G02B 6/0073* (2013.01); *G02B 6/0088* (2013.01); *G02F 1/133603* (2013.01); *G02F 1/133605* (2013.01)

(56) References Cited

FOREIGN PATENT DOCUMENTS

| | | |
|---|---|---|
| CN | 111208673 A | 5/2020 |
| CN | 210666266 U | 6/2020 |
| CN | 212694219 U | 3/2021 |
| CN | 213399142 U | 6/2021 |
| JP | H1184358 A | 3/1999 |

\* cited by examiner

BACKLIGHT MODULE INCLUDING OVERLAPPED REFLECTIVE SHEETS AND DISPLAY DEVICE INCLUDING THE SAME

FIELD OF INVENTION

This application relates to a field of display technology, and in particular to a backlight module and a display device.

BACKGROUND OF INVENTION

Current miniature light-emitting diodes (mini-LEDs) have advantages such as small size and easy realization of ultra-thin and multiple partitions, which allow mini-LED technology to become an important technological development direction at the moment. Currently, the mini-LEDs are used as a backlight source with liquid crystal display (LCD) panels in industry to achieve ultra-thin, high-brightness, and multi-partition display products. However, for large-size display products, due to a size limitation of a surface mounting technology (SMT) machine, a backlight of a display product usually needs to be formed by splicing multiple mini-LED light boards, so that a problem of uneven brightness (Mura) tends to occur at splicing positions of light boards, which causes poor visual effects of the display product.

Therefore, a technical problem of uneven brightness at the splicing positions of the light boards of current display products needs to be solved.

TECHNICAL PROBLEM

Therefore, the technical problem of uneven brightness at the splicing positions of the light boards of the current display products needs to be solved.

SUMMARY OF INVENTION

In order to solve the technical problem, the technical solutions provided by this application are as follows:

An embodiment of the application provides a backlight module, which includes: a back panel; a plurality of light boards spliced on the back panel along a first direction, wherein each light board includes at least two light source groups arranged at intervals, and each light source group includes at least two light sources arranged along a second direction; and a plurality of reflective sheets configured to reflect light and overlapped along the first direction, and an overlap area of adjacent reflective sheets is located between adjacent light source groups in the same light board; wherein, a splicing area of adjacent light boards is located in a non-overlap area of the same reflective sheet.

In the backlight module provided by an embodiment of the present application, the backlight module further includes a plurality of light boards spliced on the back panel along the second direction, wherein each light board includes at least two light source groups arranged at intervals, and each light source group includes at least two light sources arranged along the first direction; and a plurality of reflective sheets configured to reflect light and overlapped along the second direction, and an overlap area of adjacent reflective sheets is located between adjacent light source groups in the same light board; and wherein, a splicing area of adjacent light boards is located in a non-overlap area of the same reflective sheet.

In the backlight module provided by an embodiment of the present application, two of the plurality of light boards spliced with each other are defined as a first light board and a second light board, a first reflective sheet is provided on the first light board, a second reflective sheet is provided on the second light board, and the first reflective sheet extends to the second light board and overlaps the second reflective sheet.

In the backlight module provided by an embodiment of the present application, the first reflective sheet is defined with a first opening at a position corresponding to a light source on the first light board, the second reflective sheet is defined with a second opening at a position corresponding to a light source on the second light board, and an area of the first opening and an area of the second opening are both greater than an area of the corresponding light sources to expose the light sources.

In the backlight module provided by an embodiment of the present application, a thickness of the first reflective sheet and a thickness of the second reflective sheet are both less than the heights of the corresponding light sources.

In the backlight module provided by an embodiment of the present application, the first reflective sheet is defined with a third opening at a position corresponding to a light source on the second light board, and an area of the third opening is greater than the area of the second opening.

In the backlight module provided by an embodiment of the present application, the area of the first opening is equal to the area of the second opening.

In the backlight module provided by an embodiment of the present application, the number of the light source groups on the second light board is at least 3, an overlap area of the first reflective sheet and the second reflective sheet is located between two adjacent light source groups close to the splicing area of the first light board and the second light board.

In the backlight module provided by an embodiment of the present application, on the same light board, an interval between two adjacent light source groups is equal to an interval between two adjacent light sources.

In the backlight module provided by an embodiment of the present application, the light source includes a miniature light-emitting diode (mini-LED) chip.

An embodiment of the present application further provides a display device, which includes the backlight module of one of the foregoing embodiments, and a display panel disposed opposite to the backlight module.

BENEFICIAL EFFECT

In the backlight module and the display device provided in the present application, multiple light boards on the back panel are spliced with each other to form splicing areas. Each light board is further provided with a reflective sheet, and an overlap area of two adjacent reflective sheets is set between the light source groups on the same light board. By setting the overlap area of adjacent reflective sheets in the non-splicing area, the protrusion of the reflective sheets in the overlap area will not reflect too much light to the splicing area and cause uneven brightness at the splicing position, which solves the problem of uneven brightness at the splicing positions of the light boards of the current display products.

DESCRIPTION OF DRAWINGS

In order to explain the embodiments or the technical solutions in the prior art more clearly, the following will briefly introduce the drawings that need to be used in the description of the embodiments or in the prior art. Obviously, the drawings in the description only refer to some embodiments of the invention. For those of ordinary skill in the art, other drawings can be obtained based on these drawings without creative work.

DETAILED DESCRIPTION OF PREFERRED EMBODIMENTS

Figure 1:
FIG. 1 is a schematic structural diagram of a cross-sectional view of a backlight module provided by an embodiment of the present application.

The following will clearly and completely describe the technical solutions in the embodiments of the present application with reference to the drawings in the embodiments of the present application. Obviously, the embodiments are only part of the embodiments of the present application, rather than all the embodiments. Based on these embodiments in this application, all other embodiments obtained by those skilled in the art without paying creative work shall fall within the protection scope of this application.

The description of the embodiments refers to the attached drawings to illustrate specific embodiments in which the present invention can be implemented. The directional terms mentioned in this application, such as "above", "below", "front", "back", "left", "right", "inside", "outside", "side", etc., are only directions for referring to the attached drawings. Therefore, the directional terms are used to describe and understand this application, rather than to limit this application. In the drawings, units with similar structures are indicated by the same reference numerals. In the drawings, for clear understanding and ease of description, the thickness of some layers and regions are exaggerated. That is, the size and thickness of each component shown in the drawings are arbitrarily shown, but the application is not limited thereto.

Figure 2:
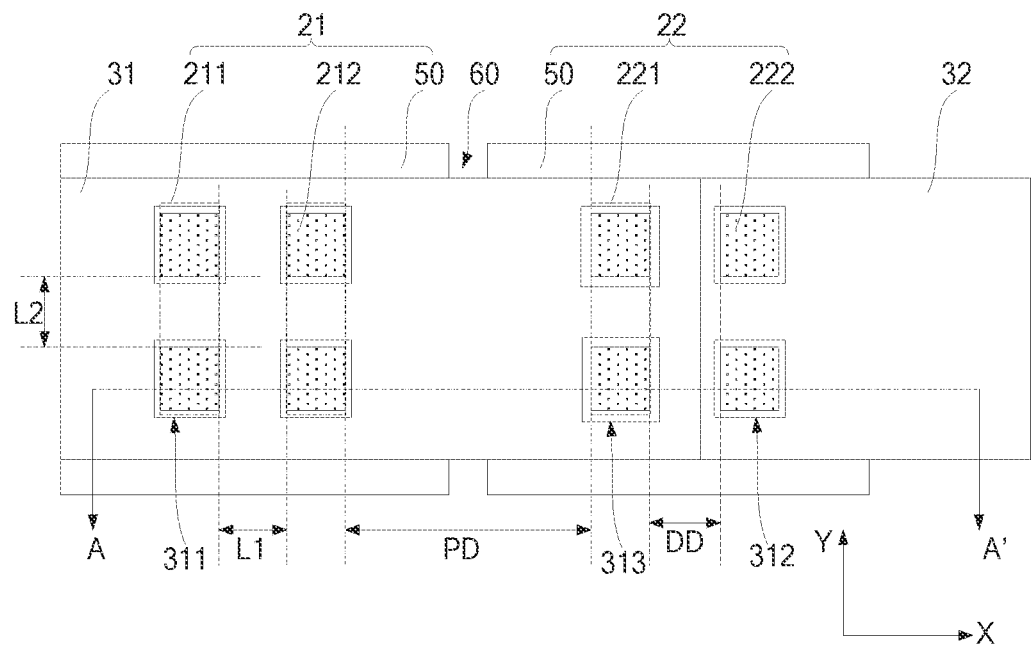
FIG. 2 is a schematic structural diagram of a top view of a splicing light board according to an embodiment of the present application.
Figure 3:
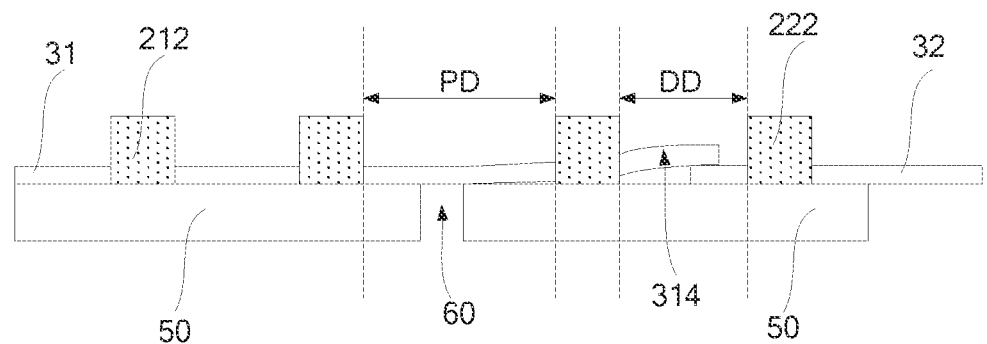
FIG. 3 is a schematic structural diagram of a cross-sectional view along an A-A direction in FIG. 2.

Please refer to FIG. 1 to FIG. 3. FIG. 1 is a schematic diagram of a cross-sectional structure of a backlight module provided by an embodiment of the present application. FIG. 2 is a schematic structural diagram of a top view of a splicing light board according to an embodiment of the present application. FIG. 3 is a schematic structural diagram of a cross-sectional view along an A-A direction in FIG. 2. The backlight module 100 includes optical films such as a back panel 10, a plurality of light boards 20, a reflective sheet 30, and a diffuser sheet 40, etc. The back panel 10 has an accommodation cavity for accommodating and fixing a plurality of optical films such as a light board 20, a reflective sheet 30, and a diffuser sheet 40. A plurality of the light boards 20 (such as the first light board 21 and the second light board 22 as shown in FIG. 2) are spliced and disposed at the bottom of the accommodation cavity formed by the back board 10 along the first direction X. The reflective sheet 30 is disposed on the light-emitting surface of the light board 20 to reflect the light emitted by the light board 20 to improve the utilization rate of light. The diffuser sheet 40 is disposed on the upper side of the reflective sheet 30 and is configured to diffuse light to form a uniform surface light source.

Specifically, a plurality of the light boards 20 are spliced and disposed on the back panel 10 along the first direction X. The light boards 20 (such as the first light board 21 and the second light board 22 shown in FIG. 2) include at least two light source groups (such as the first light source group 211 or the second light source group 221 shown in FIG. 2) arranged at intervals. Each light source group includes at least two light sources arranged along a second direction Y (such as the first light source 212 or the second light source 222 shown in FIG. 2), and the light sources include mini-LEDs and the like. The light board 20 further includes a driving substrate 50, the light source is disposed on the driving substrate 50, and the driving substrate 50 is configured to drive the light source to emit light. Wherein, the first direction X and the second direction Y are perpendicular to each other. Optionally, the first direction X is a horizontal direction, the second direction Y is a vertical direction or the first direction X is a vertical direction, and the second direction Y is a horizontal direction. Certainly, the present application is not limited to this, the first direction X and the second direction Y may also be set at other preset angles, for example, the preset angle is 45 degrees or 60 degrees.

Wherein on the same light board 20, the interval L1 between two adjacent light source groups is equal to the interval between two adjacent light sources L2, so that the intervals between all adjacent light sources on the same light board 20 are equal. In this way, the process can be simplified when the light source is arranged on the light board 20, and the light emitted from the entire light-emitting surface of the light board 20 is more uniform. In addition, the uneven brightness of different areas on the same light board 20 is prevented. For example, when a mini-LED light source is disposed on the light board 20, it is usually necessary to place a mini-LED chip on the transfer substrate first. Then, the mini-LED chip is transferred to the driving substrate 50 to form the light board 20 by using techniques such as mounting and mass transfer. The driving substrate 50 includes a glass substrate or a PCB board. Certainly, a driving circuit needs to be provided on the driving substrate 50 to drive the mini-LED chip to emit light. When the mini-LED chips are transferred to the drive substrate 50 at equal intervals and connected to the corresponding drive circuit, the difficulty of the transfer process can be significantly reduced, and the transfer efficiency can be improved.

Hereinafter, the splicing of adjacent light panels 20 (the first light board 21 and the second light board 22) along the first direction X will be taken as an example to specifically describe the structure of the splicing light board of the present application.

As shown in FIG. 2, two first light source groups 211 are disposed on the first light board 21 at intervals, and each of the first light source groups 211 includes two first light sources 212 arranged along the second direction Y. The second light board 22 is provided with two second light source groups 221 at intervals, and each of the second light source groups 221 includes two second light sources 222 arranged along the second direction Y. It should be noted that the number of light boards, the number of light source groups on the light boards, and the number of light sources in the light source groups shown in FIG. 2 of this embodiment are only used to illustrate the light board structure of the present application. The number of light boards, the number of light source groups on the light boards, and the number of light sources in the light source groups in this application are configured according to actual needs. For example, the number of light boards depends on the size of the light boards restricted by the process and the size of the actual product.

The first light board 21 and the second light board 22 are spliced together, and a splicing area PD is defined at the position where they are spliced. The splicing area PD refers to the area between the first light source group 211 close to the splicing position on the first light board 21 and the second light source group 221 close to the splicing position on the second light board 22, that is, the area between the adjacent first light source group 211 and the second light source group 221. After the first light board 21 and the second light board 22 are spliced, a small seam 60 will be formed in the splicing area PD. The existence of the seam 60 is likely to cause uneven brightness in the splicing area PD, which affects the display quality of the display product.

A reflective sheet is usually provided on the light board, so after the light emitted by the light source on the light board is reflected by the reflective sheet, the light is emitted more uniformly, and the utilization rate of the light can be improved. Taking into account the uneven brightness caused by the seam, the reflective sheet is extended to the splicing area of the light board to overlap the reflective sheet on the adjacent light board. The reflective sheet is used to cover the seam, so as to improve the uneven brightness caused by the seam.

The inventor found that such a design would cause another problem, that is, the overlapped reflective sheet in the splicing area causes a protruding structure at the overlap position. The protruding structure and the flat reflective sheet have different reflection effects on the light so that the splicing area still has uneven brightness. In particular, the situation that the brightness of the splicing area is greater than the brightness of other areas of the light board has a serious impact. For example, a control end (such as driver IC, etc.) of the light board is usually located in the non-splicing area of the light board, and the various traces provided on the light board and connected to the control end are generally distributed on the splicing side of the light board and extend from the splicing side to the middle area of the light board. Because of the voltage drop, the brightness of the edge of the light board will be greater than the brightness of the middle area of the light board. The brightness of the splicing area of the light board is greater than that of other areas of the light board, resulting in uneven brightness of the splicing area. The existence of the protruding structure of the reflective sheet in the splicing area will aggravate the uneven brightness of the splicing area.

For this issue, the inventor found a solution: Please continue to refer to FIG. 2 and FIG. 3. The light board 20 is further provided with a plurality of reflective sheets 30 (the first reflective sheet 31 and the second reflective sheet 32 as shown in FIG. 2) overlapped along the first direction X. The overlap area DD of the adjacent reflective sheets 30 is located between the adjacent light source groups in the same light board 20.

Specifically, a first reflective sheet 31 is provided on the first light board 21, a second reflective sheet 32 is provided on the second light board 22, and the first reflective sheet 31 extends to the second light board 22 and overlaps the second reflective sheet 32. More specifically, the first reflective sheet 31 crosses the splicing area PD and overlaps with the second reflective sheet 32 between the adjacent second light source groups 221 on the second light board 22 to form the overlap area DD of the first reflective sheet 31 and the second reflective sheet 32. In the overlap area DD, there is a partial overlap area between the first reflective sheet 31 and the second reflective sheet 32, so that the overlap position of the first reflective sheet 31 and the second reflective sheet 32 is a protruding structure 314, which causes a height difference. The height difference can usually be about 0.3 mm, which is equivalent to the thickness of the first reflective sheet 31 or the second reflective sheet 32. Wherein, the height of the protruding structure 314 is equal to the sum of the thicknesses of the first reflective sheet 31 and the second reflective sheet 32.

It should be noted that the first reflective sheet 31 on the first light board 21 exceeds the boundary of the first light board 21 on the side close to the splicing area PD. The second reflective sheet 32 on the second light board 22 does not cover the edge of the second light board 22 on the side close to the splicing area PD. That is, the first reflective sheet 31 and the second reflective sheet 32 do not overlap in the splicing area PD. However, whether the side of the first reflective sheet 31 away from the splicing area PD is flush with the boundary of the first light board 21 depends on the number of the light boards 20 spliced and arranged along the first direction X and the position of the first light board 21 in the light boards 20 spliced and arranged along the first direction X.

For example, when the number of light boards 20 spliced and arranged along the first direction X is two, the side of the first reflective sheet 31 away from the splicing area PD is flush with the boundary of the first light board 21. When the number of light boards 20 spliced and arranged along the first direction X is three or more, and when the first light board 21 is located at the edge of the plurality of spliced light boards 20, the side of the first reflective sheet 31 away from the splicing area PD is flush with the boundary of the first light board 21. When other light boards (except the second light board 22) are spliced with the first light board 21, the side of the first reflective sheet 31 away from the splicing area PD does not cover the boundary of the first light board 21.

Correspondingly, whether the side of the second reflective sheet 32 away from the splicing area PD is flush with the boundary of the second light board 22 also depends on the number of the light boards 20 spliced and arranged along the first direction X and the position of the second light board 22 in the light boards 20 spliced and arranged along the first direction X. This will not be repeated herein.

In addition, the splicing area PD of adjacent light boards 20 is located in the non-overlap area DD of the same reflective sheet 30, and the same reflective sheet 30 refers to the reflective sheet 30 corresponding to the splicing area PD of the adjacent light boards 20. For example, if the reflective sheet 30 corresponding to the splicing area PD of the first light board 21 and the second light board 22 is the first reflective sheet 31, then the splicing area PD of the first light board 21 and the second light board 22 is located in the non-overlap area DD of the first reflective sheet 31. In this way, the protruding structure 314 formed by the first reflective sheet 31 and the second reflective sheet 32 in the overlap area DD will be far away from the splicing area PD of the first light board 21 and the second light board 22, which solves the problem of uneven brightness of the splicing area caused by the overlap area of the reflective sheets being located in the splicing area.

Further, the first reflective sheet 31 is defined with a first opening 311 at a position corresponding to the first light source group 211 on the first light board 21, and the second reflective sheet 32 is defined with a second opening 312 at a position corresponding to the second light source 222 on the second light board 22. The area of the first opening 311 is greater than the area of the first light source group 211 so as to expose the first light source 212, and the area of the second opening 312 is greater than the area of the second light source 222 so as to expose the second light source 222. Wherein the area of the opening (such as the first opening 311 on the first reflective sheet 31) on the reflective sheet 30 refers to the opening area of the opening, and the area of the light source (such as the first light source group 211 and the second light source 222) refers to the orthographic projection area of the light source on the light board 20.

Optionally, in order to reduce the process difficulty, the specifications of the first light source 212 and the second light source 222 are the same, so the same transfer solution and equipment can be used in the transfer process. In addition, the light emitted from the entire light-emitting surface of the backlight formed by the splicing of the light boards 20 is more uniform, so as to reduce the brightness difference between different light boards 20. When the specifications of the first light source 212 and the second light source 222 are the same, the area of the first opening 311 on the first reflective sheet 31 is equal to the area of the second opening 312 on the second reflective sheet 32.

In addition, the first reflective sheet 31 is defined with a third opening 313 at a position corresponding to the second light source 222 on the second light board 22, and the area of the third opening 313 is greater than the area of the second opening 312. Specifically, the first reflective sheet 31 crosses the splicing area PD and extends toward the first direction X and it overlaps with the second reflective sheet 32 between the adjacent second light source groups 221 on the second light board 22. Therefore, the first reflective sheet 31 will also cross at least one second light source group 221. The first reflective sheet 31 needs to be defined with a third opening 313 at each second light source 222 in the second light source group 221 that it crosses, to expose the corresponding second light source 222.

The overlap of the first reflective sheet 31 and the second reflective sheet 32 is performed after or during the splicing of the first light board 21 and the second light board 22. In order to enable the first reflective sheet 31 to smoothly cross the second light source 222 in the second light source group 221 and overlap the second reflective sheet 32, the third opening 313 on the first reflective sheet 31 needs to be greater than the second opening 312 on the second reflective sheet 32, so that the first reflective sheet 31 will not interfere with the corresponding second light source 222 when overlapping.

Further, the thickness of the first reflective sheet 31 and the second reflective sheet 32 are both less than the height of the corresponding light source. For example, the thickness of the first reflective sheet 31 is less than the height of the first light source 212, and the thickness of the second reflective sheet 32 is less than the height of the second light source 222. In addition, because the first reflective sheet 31 has a first opening 311 at a position corresponding to the first light source 212 and a third opening 313 at a position corresponding to the second light source 222, and the second reflection sheet 32 has a second opening 312 at a position corresponding to the second light source 222, so that the first light source 212 can pass through the first opening 311 and exceed the height of the first reflective sheet 31, the second light source 222 can pass through the second opening 312 and the third opening 313 and exceed the height of the second reflective sheet 32, and the height of the second light source 222 is further greater than the height of the protruding structure 314 at the overlap position of the first reflective sheet 31 and the second reflective sheet 32. In this way, the light emitted by the first light source group 211 and the second light source 222 all around will irradiate the corresponding reflective sheet 30, and it is reflected by the reflective sheet 30 to the diffuser sheet 40, which greatly improves the utilization rate of the light emitted by the light source.

The diffuser sheet 40 has the function of diffusing light, so that the light passing through the diffuser sheet 40 is emitted with a uniform surface light source. Optionally, the diffuser sheet 40 may be formed by dispersing scattering particles in a base material such as resin. When light passes through the diffuser sheet 40, because the diffuser sheet 40 has media with different refractive indexes, the light will undergo phenomena of refraction, reflection, and scattering, which can correct the light into a uniform surface light source to achieve the effect of optical diffusion.

Figure 4:
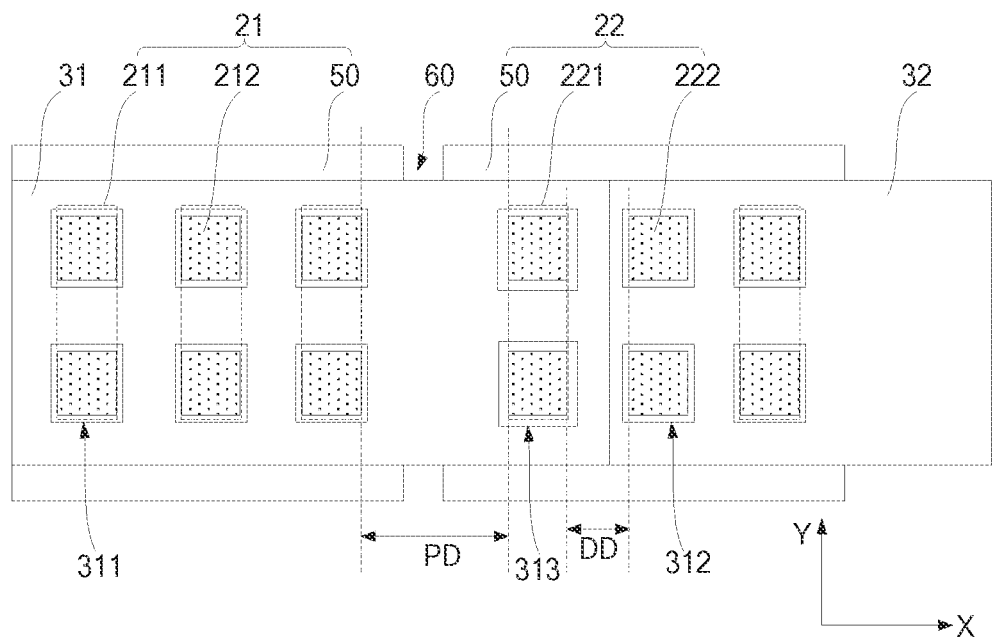
FIG. 4 is a schematic structural diagram of another top view of a splicing light board according to an embodiment of the present application.

In one embodiment, please refer to FIG. 4, which is a schematic structural diagram of another top view of a splicing light board according to an embodiment of the present application. The difference from the foregoing embodiment is that the number of the second light source groups 221 on the second light board 22 is at least 3. The overlap area DD of the first reflective sheet 31 and the second reflective sheet 32 is located between two adjacent second light source groups 221 close to the splicing area PD of the first light board 21 and the second light board 22.

The overlap area DD of the first reflective sheet 31 and the second reflective sheet 32 is arranged between the second light source group 221 close to the splicing area PD, so that the first reflective sheet 31 only needs to cross one second light source group 221. In this way, only a small number of third openings 313 need to be defined on the first reflective sheet 31, which reduces the process difficulty of the first reflective sheet 31. Furthermore, the overlapping of the first reflective sheet 31 and the second reflective sheet 32 is simpler, and the process difficulty of the overlapping is reduced. In addition, by adopting such an overlapping manner, the first reflective sheet 31 does not need to exceed the boundary of the first light board 21 too much, and the stability of the first reflective sheet 31 can be improved. For other descriptions, please refer to the above-mentioned embodiment, which will not be repeated herein.

Figure 5:
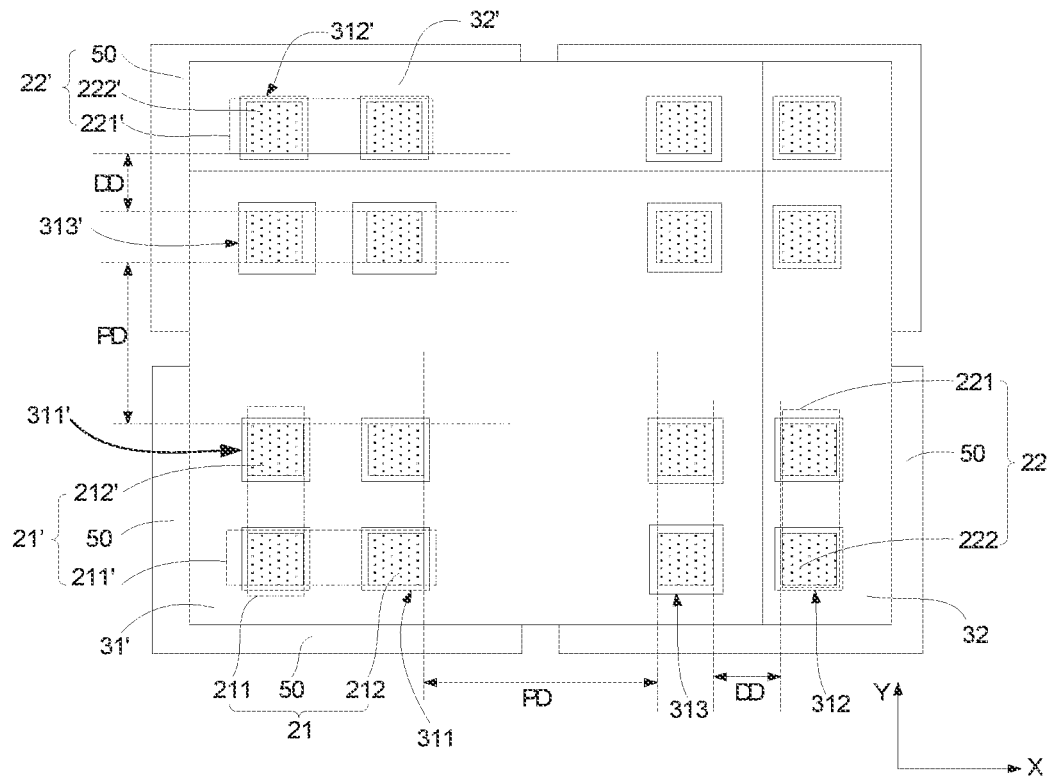
FIG. 5 is a schematic structural diagram of yet another top view of a splicing light board provided by an embodiment of the present application.

In one embodiment, please refer to FIG. 1 and FIG. 5 together. FIG. 5 is a schematic structural diagram of yet another top view of a splicing light board provided by an embodiment of the present application. The difference from the foregoing embodiment is that the backlight module 100 further includes a plurality of light boards 20 which are spliced and arranged on the back panel 10 along the second direction Y. The light board 20 includes at least two light source groups arranged at intervals, each of the light source groups includes at least two light sources arranged along the first direction X, and a plurality of reflective sheets 30 for reflecting light overlapped along the second direction Y, the overlap area DD of adjacent reflective sheets 30 is located between adjacent light source groups in the same light board 20. Wherein, the splicing area PD of adjacent light boards 20 is located in the non-overlap area DD of the same reflective sheet 30.

Specifically, in this embodiment, the first light board 21' and the second light board 22' of the light board 20 that are adjacently spliced along the second direction Y are taken as an example to specifically describe the splicing light board structure of the present application. The backlight source of the backlight module 100 includes a first light board 21 and a second light board 22 arranged adjacently and spliced along the first direction X, and the first light board 21' and the second light board 22' adjacently spliced along the second direction Y, wherein the first light board 21' and the first light board 21 are the same light board, and the second light board 22' and the second light board 22 are different light boards. Certainly, this embodiment only takes the backlight source of the backlight module 100 formed by vertical and horizontal splicing of 4 light boards as shown in FIG. 5 as an example, and the application is not limited to this. The backlight source of the backlight module 100 of the present application can be formed by splicing more light boards 20. The specific number of splicing light boards 20 depends on the size of the light board 20, the size of the display product, and the shape of the display product, etc.

The first light board 21' is provided with two first light source groups 211' at intervals, and each of the first light source groups 211' includes two first light sources 212' arranged along the second direction Y. The second light board 22' is provided with two second light source groups 221' at intervals, and each of the second light source groups 221' includes two second light sources 222' arranged along the second direction Y.

Further, the first light board 21' is provided with a first reflective sheet 31', and the second light board 22' is provided with a second reflective sheet 32'. The first reflective sheet 31' extends to the second light board 22' and overlaps the second reflective sheet 32'. The splicing area PD of the first light board 21' and the second light board 22' is located in the non-overlap area DD of the first reflective sheet 31'. In this way, the protruding structure formed by the first reflective sheet 31' and the second reflective sheet 32' in the overlap area DD will be far away from the splicing area PD of the first light board 21' and the second light board 22', which solves the problem of uneven brightness of the splicing area caused by the overlap area of the reflective sheets being located in the splicing area.

The first reflective sheet 31' is defined with a first opening 311' at a position corresponding to the first light source 212' on the first light board 21', and the second reflective sheet 32' is defined with a second opening 312' at a position corresponding to the second light source 222' on the second light board 22'. The area of the first opening 311' is greater than the area of the first light source 212' so as to expose the first light source 212', and the area of the second opening 312 is greater than the area of the second light source 222' so as to expose the second light source 222'.

The first reflective sheet 31' is defined with a third opening 313' at a position corresponding to the second light source 222' on the second light board 22', and the area of the third opening 313' is greater than the area of the second opening 312'. Specifically, the first reflective sheet 31' crosses the splicing area PD and extends toward the first direction X and it overlaps with the second reflective sheet 32' between the adjacent second light source groups 221' on the second light board 22'. Therefore, the first reflective sheet 31' will also cross at least one second light source group 221'. The first reflective sheet 31' needs to be defined with a third opening 313' at each second light source 222' in the second light source group 221' that it crosses, to expose the corresponding second light source 222'. For other descriptions, please refer to the above-mentioned embodiment, which will not be repeated herein.

Figure 6:
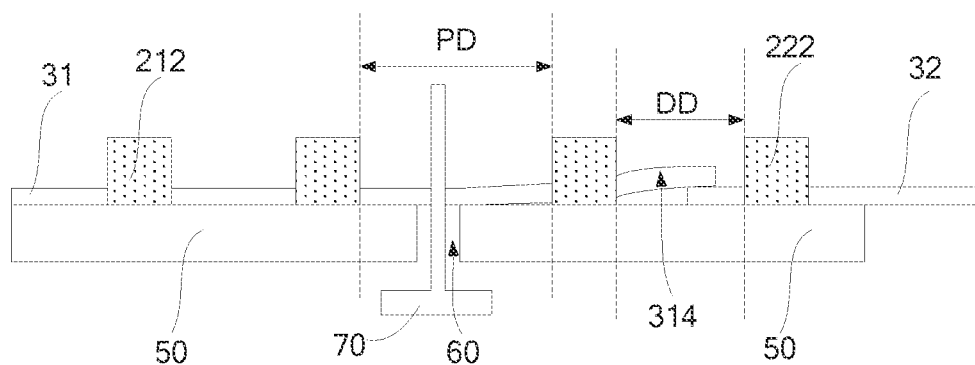
FIG. 6 is a schematic structural diagram of a cross-sectional view of a splicing light board according to an embodiment of the present application.

In one embodiment, please refer to FIG. 1 to FIG. 6 together. FIG. 6 is a schematic structural diagram of a cross-sectional view of a splicing light board according to an embodiment of the present application. The difference from the above-mentioned embodiment is that the seam 60 in the splicing area PD of the first light board 21 and the second light board 22 is provided with a supporting column 70. The supporting column 70 passes through the seam 60 and exceeds the heights of the light sources (such as the first light source 212 and the second light source 222) on the light boards (such as the first light board 21 and the second light board 22) to support the diffuser sheet 40 and other optical films above the light board. In addition, the supporting column 70 can also prevent light mixing of the light sources of the first light board 21 and the second light board 22. For other descriptions, please refer to the above-mentioned embodiment, which will not be repeated herein.

Figure 7:
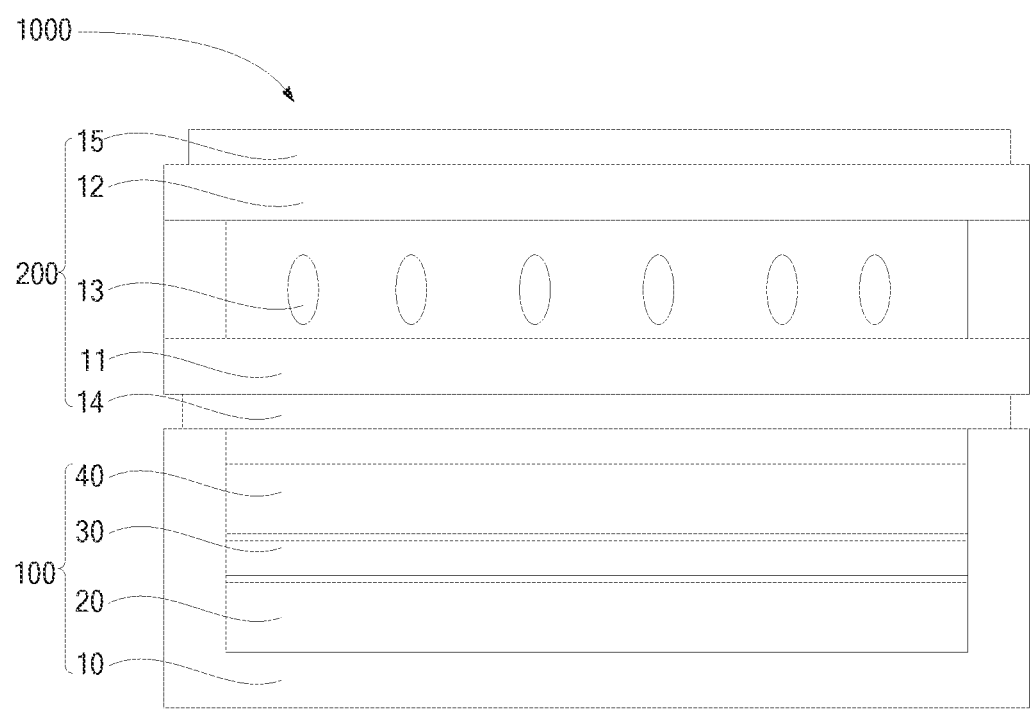
FIG. 7 is a schematic structural diagram of a cross-sectional view of a display device provided by an embodiment of the present application.

In one embodiment, please refer to FIG. 7, which is a schematic structural diagram of a cross-sectional view of a display device provided by an embodiment of the present application. The display device 1000 includes the backlight module 100 of the foregoing embodiments, a display panel 200 disposed opposite to the backlight module 100, and a cover plate disposed on the side of the display panel 200 away from the backlight module 100, etc. The backlight module 100 provides backlight for the display panel 200. The display panel 200 includes a first substrate 11 and a second substrate 12 disposed opposite to each other, a plurality of liquid crystal molecules 13 disposed between the first substrate 11 and the second substrate 12, a lower polarizer 14 attached to the first substrate 11 facing the backlight module 100, and an upper polarizer 15 attached to a side of the second substrate 12 away from the first substrate 11. Wherein, the first substrate 11 is an array substrate, and the second substrate 12 is a color filter substrate.

According to the above embodiments, it can be seen that: A backlight module and a display device are provided. A plurality of light boards on the back panel of the backlight module are spliced with each other to form splicing areas, each light board is further provided with a reflective sheet, and the overlap area of two adjacent reflective sheets is set between the light source groups on the same light board. By setting the overlap area of adjacent reflective sheets in the non-splicing area, the protrusion of the reflective sheet in the overlap area will not reflect too much light to the splicing area and cause uneven brightness at the splicing positions, which solves the problem of uneven brightness at the splicing positions of the light boards of the current display products.

In the foregoing embodiments, the description of each embodiment has its own focus. For parts that are not described in detail in a certain embodiment, reference may be made to related descriptions of other embodiments.

The embodiments of the present application are described in detail above, and specific examples are used in this article to illustrate the principles and implementation of the present application. The description of the embodiments is to help understand the technical solutions and core ideas of this application. Those of ordinary skill in the art should understand that it is possible to modify the technical solutions described in the embodiments, or equivalently replace some of the technical features. These modifications or replacements do not cause the essence of the corresponding technical solutions to deviate from the scope of the technical solutions of the embodiments of the present application.

What is claimed is:

1. A backlight module, comprising:
   a back panel;
   a plurality of light boards spliced on the back panel along a first direction, wherein each light board comprises at least two light source groups arranged at intervals, and each light source group comprises at least two light sources arranged along a second direction; and
   a plurality of reflective sheets configured to reflect light and overlapped along the first direction, and an overlap area of adjacent reflective sheets is located between adjacent light source groups in a same light board; and
   wherein a splicing area of adjacent light boards is located in a non-overlap area of a same reflective sheet; two of the plurality of light boards spliced with each other are defined as a first light board and a second light board, a first reflective sheet is provided on the first light board, a second reflective sheet is provided on the second light board, and the first reflective sheet extends to the second light board and overlaps the second reflective sheet.

2. The backlight module according to claim 1, further comprising:
   a plurality of light boards spliced on the back panel along the second direction, wherein each light board comprises at least two light source groups arranged at intervals, and each light source group comprises at least two light sources arranged along the first direction; and
   a plurality of reflective sheets configured to reflect light and overlapped along the second direction, and an overlap area of adjacent reflective sheets is located between adjacent light source groups in a same light board; and
   wherein a splicing area of adjacent light boards is located in a non-overlap area of a same reflective sheet.

3. The backlight module according to claim 1, wherein the light sources comprise a miniature light-emitting diode (mini-LED) chip.

4. The backlight module according to claim 1, wherein the first reflective sheet is defined with a first opening at a position corresponding to a light source on the first light board, the second reflective sheet is defined with a second opening at a position corresponding to a light source on the second light board, and an area of the first opening and an area of the second opening are both greater than an area of the corresponding light sources to expose the light sources.

5. The backlight module according to claim 4, wherein a thickness of the first reflective sheet and a thickness of the second reflective sheet are both less than heights of the corresponding light sources.

6. The backlight module according to claim 4, wherein the first reflective sheet is defined with a third opening at a position corresponding to a light source on the second light board, and an area of the third opening is greater than the area of the second opening.

7. The backlight module according to claim 4, wherein the area of the first opening is equal to the area of the second opening.

8. The backlight module according to claim 1, wherein a number of the light source groups on the second light board is 3, and an overlap area of the first reflective sheet and the second reflective sheet is located between two adjacent light source groups close to the splicing area of the first light board and the second light board.

9. The backlight module according to claim 1, wherein on the same light board, an interval between two adjacent light source groups is equal to an interval between two adjacent light sources.

10. A display device, comprising a backlight module and a display panel arranged opposite to the backlight module, wherein the backlight module comprises:
    a back panel;
    a plurality of light boards spliced on the back panel along a first direction, wherein each light board comprises at least two light source groups arranged at intervals, and each light source group comprises at least two light sources arranged along a second direction; and
    a plurality of reflective sheets configured to reflect light and overlapped along the first direction, and an overlap area of adjacent reflective sheets is located between adjacent light source groups in a same light board; and
    wherein a splicing area of adjacent light boards is located in a non-overlap area of a same reflective sheet; two of the plurality of light boards spliced with each other are defined as a first light board and a second light board, a first reflective sheet is provided on the first light board, a second reflective sheet is provided on the second light board, and the first reflective sheet extends to the second light board and overlaps the second reflective sheet.

11. The display device according to claim 10, further comprising:
    a plurality of light boards spliced on the back panel along the second direction, wherein each light board comprises at least two light source groups arranged at intervals, and each light source group comprises at least two light sources arranged along the first direction; and
    a plurality of reflective sheets configured to reflect light and overlapped along the second direction, and an overlap area of adjacent reflective sheets is located between adjacent light source groups in a same light board; and
    wherein a splicing area of adjacent light boards is located in a non-overlap area of a same reflective sheet.

12. The display device according to claim 10, wherein the light sources comprise a mini-LED chip.

13. The display device according to claim 10, wherein the first reflective sheet is defined with a first opening at a position corresponding to a light source on the first light board, the second reflective sheet is defined with a second opening at a position corresponding to a light source on the second light board, and an area of the first opening and an area of the second opening are both greater than an area of the corresponding light sources to expose the light sources.

14. The display device according to claim 13, wherein a thickness of the first reflective sheet and a thickness of the second reflective sheet are both less than heights of the corresponding light sources.

15. The display device according to claim 13, wherein the first reflective sheet is defined with a third opening at a position corresponding to a light source on the second light board, and an area of the third opening is greater than the area of the second opening.

16. The display device according to claim 13, wherein the area of the first opening is equal to the area of the second opening.

17. The display device according to claim 10, wherein a number of the light source groups on the second light board is 3, and an overlap area of the first reflective sheet and the second reflective sheet is located between two adjacent light source groups close to the splicing area of the first light board and the second light board.

18. The display device according to claim 10, wherein on the same light board, an interval between two adjacent light source groups is equal to an interval between two adjacent light sources.

\* \* \* \* \*